Oct. 30, 1951   J. C. SEAILLES   2,573,615
SETTLING TANK
Filed May 23, 1946

INVENTOR
JEAN CHARLES SEAILLES
By Robert Calvert
ATTORNEY

Patented Oct. 30, 1951

2,573,615

UNITED STATES PATENT OFFICE 2,573,615

SETTLING TANK

Jean Charles Séailles, Paris, France

Application May 23, 1946, Serial No. 672,846
In France May 11, 1945

2 Claims. (Cl. 210—57)

This invention relates to apparatus for the separation of solids from liquids. It relates more particularly to settling equipment including spaced inclined settling plates to hasten the separation and increase the output of settled material in proportion to the overall capacity of the settling tank in which the equipment is contained.

Briefly stated the invention comprises settling equipment comprising a series of spaced generally parallel settling plates to receive solid material settled from suspension in a liquid. In a modification the invention comprises means for oscillating the assembly of settling plates, shutters for directing the flow of suspension to be settled through the assembly, and means for closing the spaces between the lateral edges of adjacent plates. In a modification the invention includes also supplemental settling plates for thickening the sediment deposited on the assembly first mentioned.

The invention will be illustrated by description in connection with the attached drawings to which reference is made.

Figure 1:
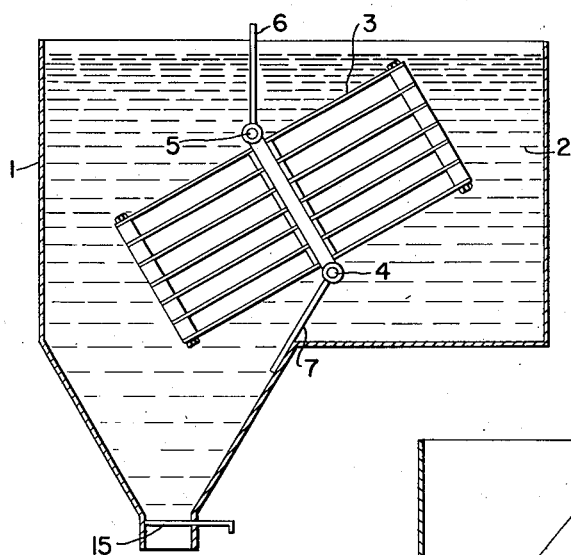
Fig. 1 is a side sectional view of a preferred form of the invention.

The views are in part diagrammatic and the parts not shown are conventional.

There are shown tank 1 containing a fluid suspension 2 from which suspended particles are to be settled, and an assembly of spaced parallel settling plates 3.

The plates are pivotally mounted as at 4 and 5. A shutter plate 6 extends upwardly from the uppermost one of the settling plates and another shutter plate 7 extends downwardly from the lowermost of the settling plates, these shutter plates serving as baffles to direct the flow of suspension.

Gate 15 (Fig. 1) is for discharge of settled sludge.

The lateral members closing the space between side edges of the plates are shown at 8 and perforations in adjacent ones of the plates at 9.

Figure 4:
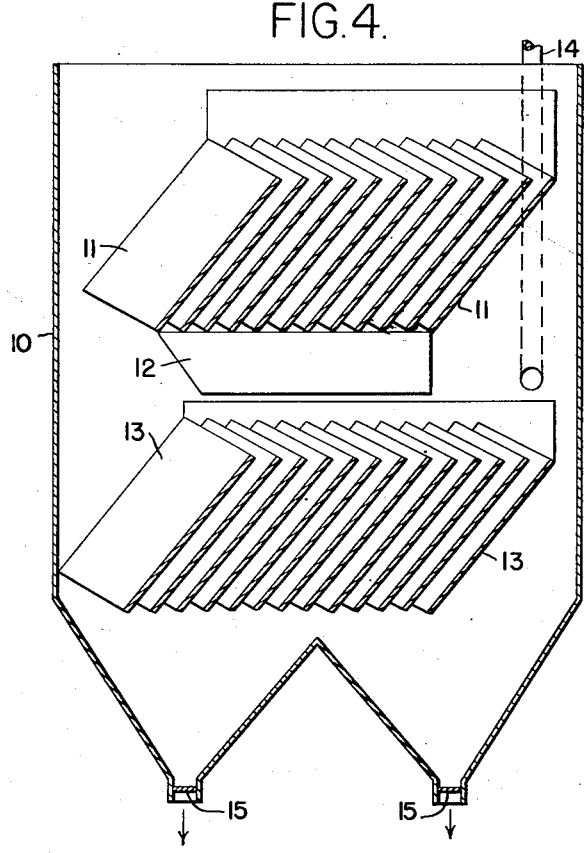
Fig. 4 is a side view partly in section of a modified form of the settling equipment.

In Fig. 4 there is shown a modified form of settling tank 10, parallel settling plates 11, a baffle 12 disposed below the said plates for delivering sediment therefrom to the series of parallel thickening plates 13 disposed below the plates first mentioned and below the said baffle.

This equipment of Fig. 4 has inlet line 14 and gates 15 for discharge of solid material, as well as the conventional overflow outlet (not shown).

When the perforated plates are used as in Fig. 3, there is disclosed an imperforate plate 16 below the last of the perforate plates and a discharge 17 below the discharge end of the imperforate plate.

The shutter plates 6 and 7 serve to provide the direction of flow of the suspension of solids in the liquid medium and to cause the suspension to flow through the spaced, approximately parallel settling plates from end to end thereof.

The operation of the equipment will be largely evident from the description of it that has been given.

Figure 2:
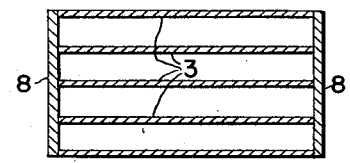
Fig. 2 is a detailed sectional view showing the lateral closing elements extending between the edges of adjacent ones of the settling plates.

A suspension of the solids to be separated is delivered to the tank 1 of Fig. 1 by any conventional means (not shown) or to the tank 10 of Fig. 4 through the inlet pipe 14. The shutter plates or baffles 6 and 7 of Fig. 1 or the natural currents in the use of the equipment of Fig. 4 direct the flow of suspension between the parallel settling plates 3 or 11. When the side closing means 8 of Fig. 2 are used these promote flow of the suspension through the plates from end to end with a minimum of disturbance and no outflow through the side edges thereof.

The discharge of sediment on the plates 3 is promoted by oscillation of the assembly from time to time on the pivot points 4—5, either by force applied manually as to the exposed end of the shutter plate 6 or by any suitable mechanical means which is not shown but which is usual for such purpose.

In the embodiment shown in Fig. 4 the sediment which falls from or is discharged from the settling plates 11 strikes a baffle board 12 and is deflected between the parallel plates 13 in the lower or thickening assembly. Here the material settles again before finally falling from the thickening plates 13 to one of the outlets 15 shown at the bottom of that equipment.

The perforations of the settling plates 9 (Fig. 3) cause the settled and originally somewhat watery material from the perforated plates 9 to pass through the openings as the material moves downwardly on the plates towards the discharge. The material finally settles upon the imperforate plate 16 which is the lower one of the series in Fig. 3. From that plate the material passes to the sediment discharge 17.

The apparatus is simple to construct, effective in giving rapid sedimentation of material and of high capacity of output of such material in proportion to the volume of the tank used for the fluid mixture to be settled.

Figure 3:
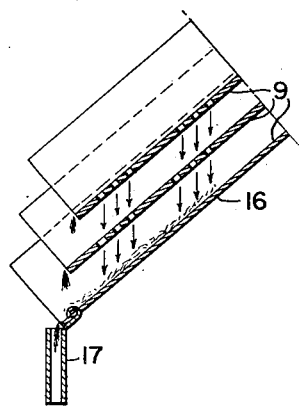
Fig. 3 is a view of a modified form showing perforations in the settling plates.

It will be understood that the structures illustrated in Figs. 2 and 3 are alternates for the assemblies of settling plates as shown in Fig. 1 and may be substituted therefor.

It will be understood also that it is intended to cover all changes and modifications of the examples of the invention herein chosen for the purpose of illustration which do not constitute departures from the spirit and scope of the invention.

What I claim is:

1. Settling apparatus for separating suspended solid material from the liquid medium in a turbid mixture, the apparatus comprising a tank for holding the turbid mixture, an outlet for settled material, a series of spaced approximately parallel settling plates disposed in normally inclined manner within the tank and below the top thereof, closing means extending between the lateral edges of the settling plates and closing the spaces between the plates at the side edges thereof, a shutter plate extending from the lowest one of the said plates and a second shutter plate extending upwardly from the uppermost ones of the said plates, the shutter plates serving as baffles to direct the flow of the said mixture through the said spaces defined between the settling plates.

2. The settling apparatus of claim 1 including a pivotal mounting of the said settling plates causing the said plates to be movable on the mounting and including a pivotal mounting of the said shutter plates so that the settling plates and the shutter plates are independently movable.

JEAN CHARLES SÉAILLES.

REFERENCES CITED

The following references are of record in the file of this patent:

UNITED STATES PATENTS

| Number | Name | Date |
|---|---|---|
| 344,740 | Howatson | June 29, 1886 |
| 349,990 | Gaillett et al. | Sept. 28, 1886 |
| 367,308 | MacNab, Sr., et al. | July 26, 1887 |
| 751,038 | Wollaston | Feb. 2, 1904 |
| 1,020,013 | Arbuckle | Mar. 12, 1912 |
| 1,177,849 | De Kalb | Apr. 4, 1916 |
| 1,190,863 | Corne et al. | July 11, 1916 |
| 1,825,550 | Schulte | Sept. 29, 1931 |
| 1,864,511 | Jones | June 21, 1932 |
| 2,214,248 | Hawley | Sept. 10, 1940 |
| 2,316,783 | Geary | Apr. 20, 1943 |
| 2,353,602 | Trotter | July 11, 1944 |
| 2,498,292 | Naugle | Feb. 21, 1950 |

FOREIGN PATENTS

| Number | Country | Date |
|---|---|---|
| 386,312 | Great Britain | Jan. 4, 1933 |
| 674,925 | France | Oct. 28, 1929 |